May 24, 1932. P. MacKENZIE 1,859,449
FLEXIBLE METAL HOSE
Filed March 22, 1926
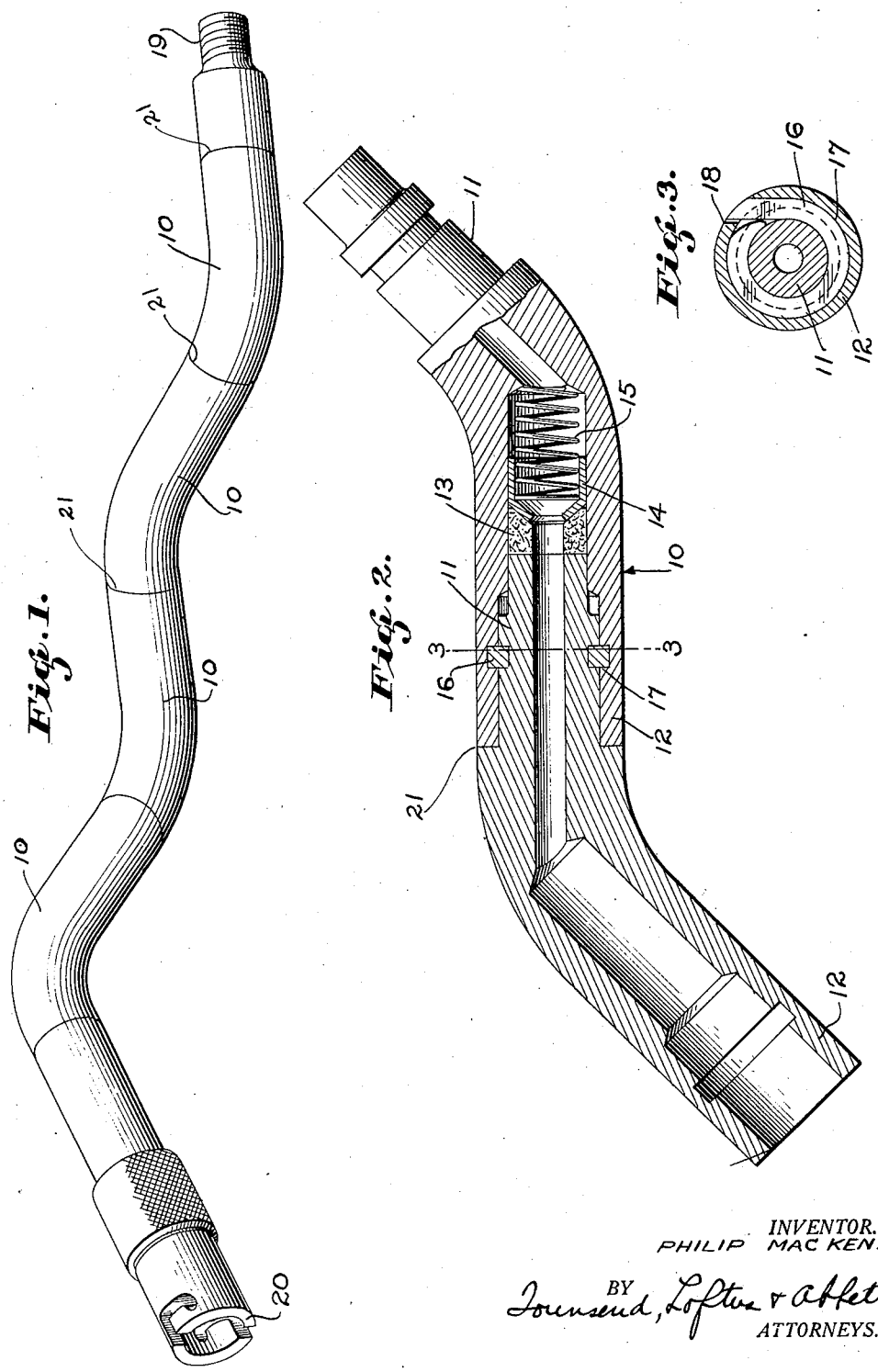
INVENTOR.
PHILIP MACKENZIE.
BY Townsend, Loftus & Abbett
ATTORNEYS.

Patented May 24, 1932

1,859,449

UNITED STATES PATENT OFFICE

PHILIP MacKENZIE, OF SAN FRANCISCO, CALIFORNIA, ASSIGNOR, BY MESNE ASSIGNMENTS, TO GAT GUN LUBRICATING CORPORATION, OF OAKLAND, CALIFORNIA, A CORPORATION OF CALIFORNIA

FLEXIBLE METAL HOSE

Application filed March 22, 1926. Serial No. 96,460.

This invention relates to flexible metal hose intended primarily for use in connection with high pressure lubricating guns.

In grease guns used in high pressure lubricating systems the rubber hose can not be made strong enough to carry the pressures when boosters are used, and consequently the metal hose has come into demand for this purpose. Such hose is made up of a number of bent sections coupled together so as to allow relative turning movement in order that various fittings on the parts to be lubricated may be reached. Prior metal hose of this type have made use of a construction which is rather expensive and does not permit sufficient flexibility to afford the necessary changes in the shape of the hose.

The object of the present invention is to provide swivel joints for a metallic hose, which joints will be simple and inexpensive in construction and will afford entire freedom of movement, so as to allow the hose to be twisted into various shapes, and which joints on account of their construction and mode of packing will be proof against leakage.

One form which my invention may assume is exemplified in the following description and illustrated in the accompanying drawings, in which Fig. 1 shows a perspective view of a metal hose embodying my invention;

Fig. 2 shows a longitudinal sectional view of two connected sections;

Fig. 3 shows a cross-section on the line 3—3 of Fig. 2.

The hose comprises a number of angular metal sections 10 connected together by means of swivel joints, the angle in each section being over 90° (135° in the illustrated embodiment). Each swivel joint, as shown in Fig. 2, is formed by telescopically fitting the reduced end portion 11 of one section into the socket formed on the end 12 of the other section. The sections are of uniform diameter, and their outer surfaces abut at seams 21, so that a smooth outer surface is formed on the hose. The end of the reduced portion 11 abuts against a packing washer 13, which packing washer has a beveled face fitted against a tapered end on a metal sleeve 14. This sleeve is pressed against the washer by means of a helical spring 15. The wedging action which occurs between the washer and sleeve on account of the beveled and tapered surfaces will cause the washer 13 to be expanded into a tight fit with the surrounding wall, so as to prevent escape of grease. The two sections are held together by means of a key 16 fitted in a key-way 17 formed in the walls of both members, and which key-ways register when the parts are fitted together. The key in straight form is inserted through an opening 18 in the wall of the outer member, and then made to encircle the key-way by driving, said key being sufficiently flexible to follow the contour of the key-way.

The hose may have as many of these swivel joints as desired; and owing to the bent form of the sections, they can be twisted into various shapes, so as to reach the different fittings on a machine which otherwise would be inaccessible. The end 19 of the hose is connected to any suitable type of gun, and the opposite end 20 is formed with any desired type of connection for engagement with the fitting on the part to be lubricated.

In use, the hose may be manipulated like an ordinary rubber hose, the various sections responding to a bending stress in any plane by rotating with respect to each other to automatically bring the hose into a bent shape corresponding to the bending stress. It is therefore only necessary to move the connection 20 to the position and direction desired, no application of force directly to the hose itself being required. The edges of the sections at the seams 21 always remain in abutting relation regardless of the bending of the hose, so that the smooth and uninterrupted outer surface of the hose is always maintained.

Various changes in the construction and arrangement of the several parts may be employed without departing from the spirit of my invention as defined by the appended claims.

Having thus described my invention, what I claim as new and desire to secure by Letters Patent is:

1. An articulated metallic hose for high pressure lubricating apparatus comprising a plurality of similar thick walled tubular pipe sections, each section having a short substantially rectilinear portion at each end, the axes of said end portions of each section being at an obtuse angle to each other and the intermediate portion of each section forming a smooth curve between the end portions, and means forming a lubricant-tight swivel connection between said sections, said means being of substantially the same external diameter as the sections, whereby the hose will have a substantially smooth continuous external surface and be conformable into any one of a plurality of different shapes while retaining its smooth continuous external surface.

2. An articulated metallic hose for high pressure lubricating apparatus comprising a plurality of similar thick walled tubular pipe sections, the axes of the ends of each of said sections being at an obtuse angle relative to each other, each section being formed in a large radius smooth curve, and means for making a lubricant-tight swivel joint between said sections, said means being located entirely within the tubular sections and prolongations of the external surfaces thereof, whereby the hose will have a substantially smooth continuous serpentine surface and be conformable into a large plurality of different shapes while at the same time retaining its smooth continuous external surface.

PHILIP MacKENZIE.